United States Patent [19]
Akkermans

[11] Patent Number: 5,402,401
[45] Date of Patent: Mar. 28, 1995

[54] SCANNING DEVICE WITH TWO-STAGE CONTROLLER FOR POSITIONING A SCANNING POINT

[75] Inventor: Antonius H. M. Akkermans, Eindhoven, Netherlands

[73] Assignee: U.S. Philips Corporation, New York, N.Y.

[21] Appl. No.: 153,707

[22] Filed: Nov. 17, 1993

[30] Foreign Application Priority Data

Nov. 20, 1992 [EP] European Pat. Off. ............ 92203587

[51] Int. Cl.$^6$ .............................................. G11B 7/09
[52] U.S. Cl. .................... 369/44.28; 369/32; 369/44.29
[58] Field of Search ............... 369/32, 44.25, 44.28, 369/44.29, 44.32, 54, 44.34; 360/78.05–78.09

[56] References Cited

U.S. PATENT DOCUMENTS

| | | | |
|---|---|---|---|
| 4,615,023 | 9/1986 | Inada et al. | 369/44.28 X |
| 4,864,552 | 9/1989 | Getreuer et al. | 369/44.34 |
| 4,914,725 | 4/1990 | Belser et al. | |
| 5,036,506 | 7/1991 | Bierhoff | 369/44.28 |

FOREIGN PATENT DOCUMENTS

0362938 4/1990 European Pat. Off. .
0463959 1/1992 European Pat. Off. .

Primary Examiner—W. R. Young
Attorney, Agent, or Firm—Leroy Eason

[57] ABSTRACT

A scanning device includes a transducer which scans the tracks of a record carrier by a scanning point of radiation. The transducer is mounted movably on a slide which can be displaced in a direction transverse to the tracks by means of a slide drive motor. At least a portion of the transducer is movable relative to the slide, by energizing an actuator. A tracking Control circuit keeps the scanning point on a track by adjusting the actuator control signal (Va) as a function of a tracking error signal. A slide speed control circuit controls the speed of the slide according to a predetermined speed profile provided by a slide speed reference signal (Vrefs). A scanning point speed control circuit controls the speed with which the scanning point is displaced transverse to the tracks so it is maintained substantially equal to the slide speed. The device may be used in a tracking mode and in a displacing mode. In the displacing mode the tracking control circuit is active. In the tracking mode the slide speed control circuit as well as the scanning point speed control circuit are active.

4 Claims, 3 Drawing Sheets

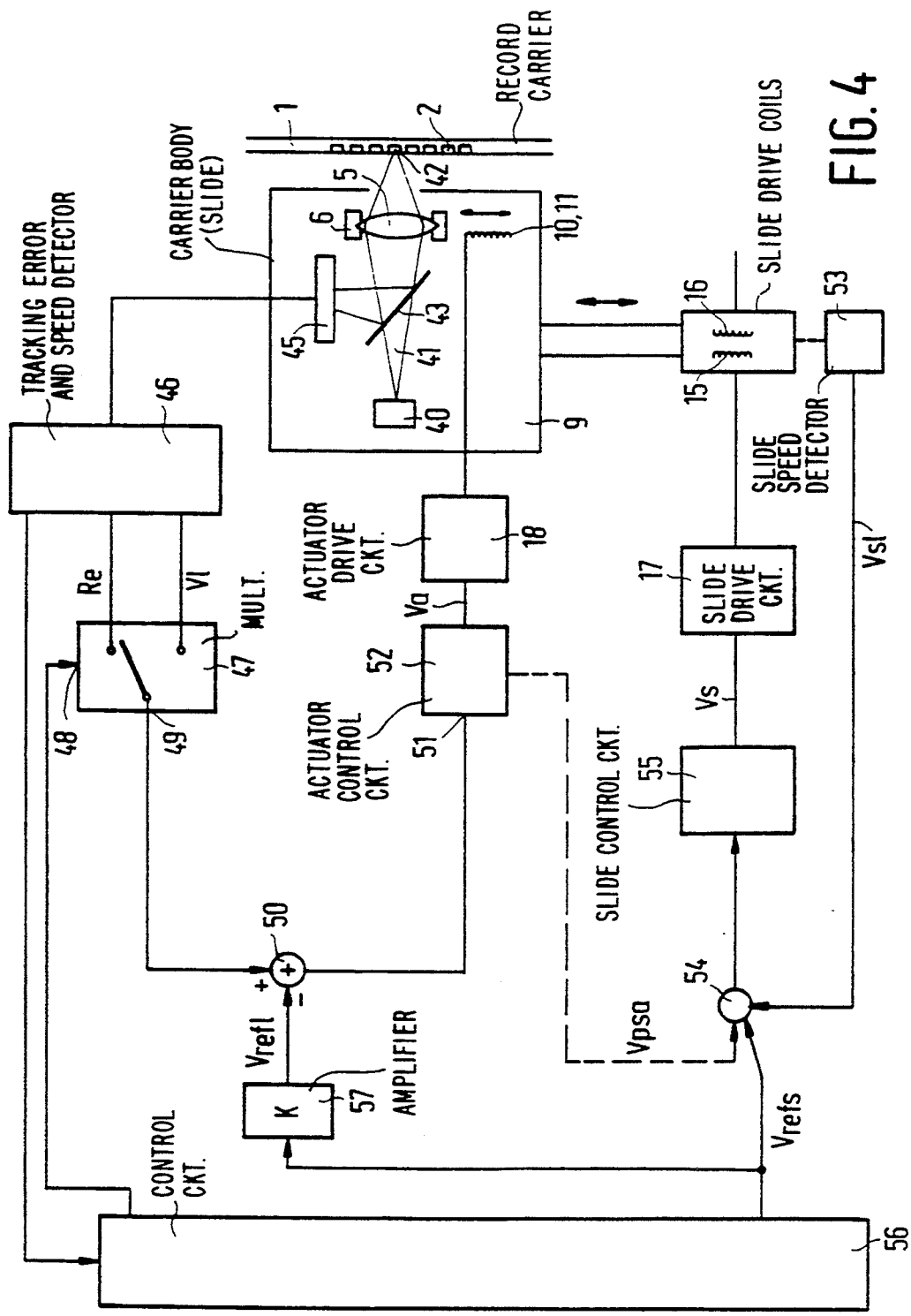

SCANNING DEVICE WITH TWO-STAGE CONTROLLER FOR POSITIONING A SCANNING POINT

BACKGROUND OF THE INVENTION

The invention relates to a scanning device including a transducer for scanning a recording medium which comprises parallel adjacent tracks, the transducer producing a scanning signal indicative of the recording medium properties at the positions of a scanning point thereon. The device comprises drive means for displacing the recording medium relative to a carrier body in the track direction, which carrier body is displaceable relative to the drive means in a direction transverse to the tracks. At least the portion of the transducer which determines the position of the scanning point on the recording medium is movable relative to the carrier body in a direction transverse to the tracks. The device also includes further drive means for displacing the carrier body in response to a drive control signal and an actuator for displacing the movable transducer portion relative to the carrier body in response to an actuator control signal. The device further includes tracking means for maintaining the scanning point on one of the tracks by adjustment of the actuator control signal in response to a tracking error signal, and displacement control means for controlling the displacement of the carrier body relative to the recording medium drive means in accordance with a specific displacement profile by adjustment of the carrier body drive control signal. The device is capable of adopting a tracking mode and a displacing mode, the tracking means being active in the tracking mode and the displacement control means being active in the displacing mode.

Such a device in the form of an optical read/write device with a two-stage controller for controlling the position of a scanning point caused by a scanning beam is known from EP-A 0 463 959. In the device described therein the carrier body is a mechanical slide. The movable transducer portion is a lens by which the scanning beam is focused on the recording medium. The lens can be moved relative to the slide by means of a so-termed focusing actuator which comprises a swivel arm on which the lens is installed. The position of the swivel arm can be changed by energizing the actuator coils. In the displacing mode, in which the scanning point is displaced to a new target track, the slide speed is controlled in accordance with a specific speed profile. The actuator control signal is maintained constant for virtually the entire time interval in which the slide is displaced. This achieves that, during the slide displacement, the actuator is maintained in a fixed position in the center of its displacement range. Therefore, when the device is to be returned to the tracking mode at the end of the displacing mode, the lens has a good starting position for locking on to the target track.

The prior-art focusing actuators are usually balanced, which is to say that the point of rotation of the swivel arm coincides with its center of gravity. This means that the position of the actuator relative to the slide is hardly influenced when the speed of the slide is increased, so that during the slide displacement the lens is kept in its place by means of a constant actuator control signal. Such a focusing actuator has a number of disadvantages. Firstly, the construction of such an actuator is relatively complex. Secondly, tolerance is nearly always present in such an actuator, which is detrimental to feedback control systems. Thirdly, the focusing actuator starts presenting residual magnetism at high speeds, so that focusing by adjustment of the distance from the lens to the medium by the focusing actuator is rendered more difficult. Other types of actuators, such as, for example, actuators acting on a spring suspension lens without making contact, do not have these detrimental effects. However, with high speeds or delays of the slide a constant actuator control signal will not be sufficient for the lens to be maintained in its fixed position and it will be pushed to an outermost position of its displacement range. Consequently, at the moment the new target track is to be locked on to, the lens will have an unfavorable starting position.

SUMMARY OF THE INVENTION

It is an object of the invention to provide means in which accelerating forces acting on the movable transducer portion have less influence on the positioning thereof relative to the slide during the slide displacement.

According to the invention this object is achieved by a device as defined in the opening paragraph, characterized in that the device comprises actuator displacement control means for producing during the displacing mode an actuator control signal related to the carrier body drive control signal which causes a displacement of the scanning point relative to the tracks substantially corresponding to said displacement profile to take place.

This achieves that the slide and the scanning point are displaced in accordance with substantially equal speed profiles, resulting in the fact that the position of the movable transducer portion continues to be near to the central position.

An embodiment of the device is characterized in that the device comprises measuring signal deriving means for deriving an actuator position signal indicative of the position of the movable transducer portion relative to the carrier body, and in that the carrier body displacement control means are coupled to the measuring signal deriving means for further adjusting the carrier body drive control signal as a function of the actuator position signal in order to maintain the position of the actuator within a predetermined displacement range.

With this embodiment it is avoided that the movable transducer portion will be displaced to its outermost position in the case where the speed profiles are not equal, for example, as a result of parameter variations.

A further embodiment attractive as a result of its reliability is characterized, in that the carrier body displacement control means comprise speed measuring means for deriving a first speed signal indicative of the speed with which the carrier body is displaced relative to the recording medium drive means. Adjusting means adjusts the carrier body drive control signal to a value such that the first speed signal substantially follows a first reference signal. The actuator displacement control means comprise second speed measuring means for deriving a second speed signal indicative of the speed with which the scanning point is displaced over the recording medium, and adjusting means for adjusting the actuator control signal to a value such that the second speed signal substantially follows a second reference signal. The device includes means for generating the first and second reference signals, the two reference signals representing two essentially equal speed profiles.

BRIEF DESCRIPTION OF THE DRAWINGS

The invention will be further explained with reference to the drawings, in which:

FIGS. 1 and 4 show embodiments of the device according to the invention;

DETAILED DESCRIPTION OF THE PREFERRED EMBODIMENTS

Figure 1:
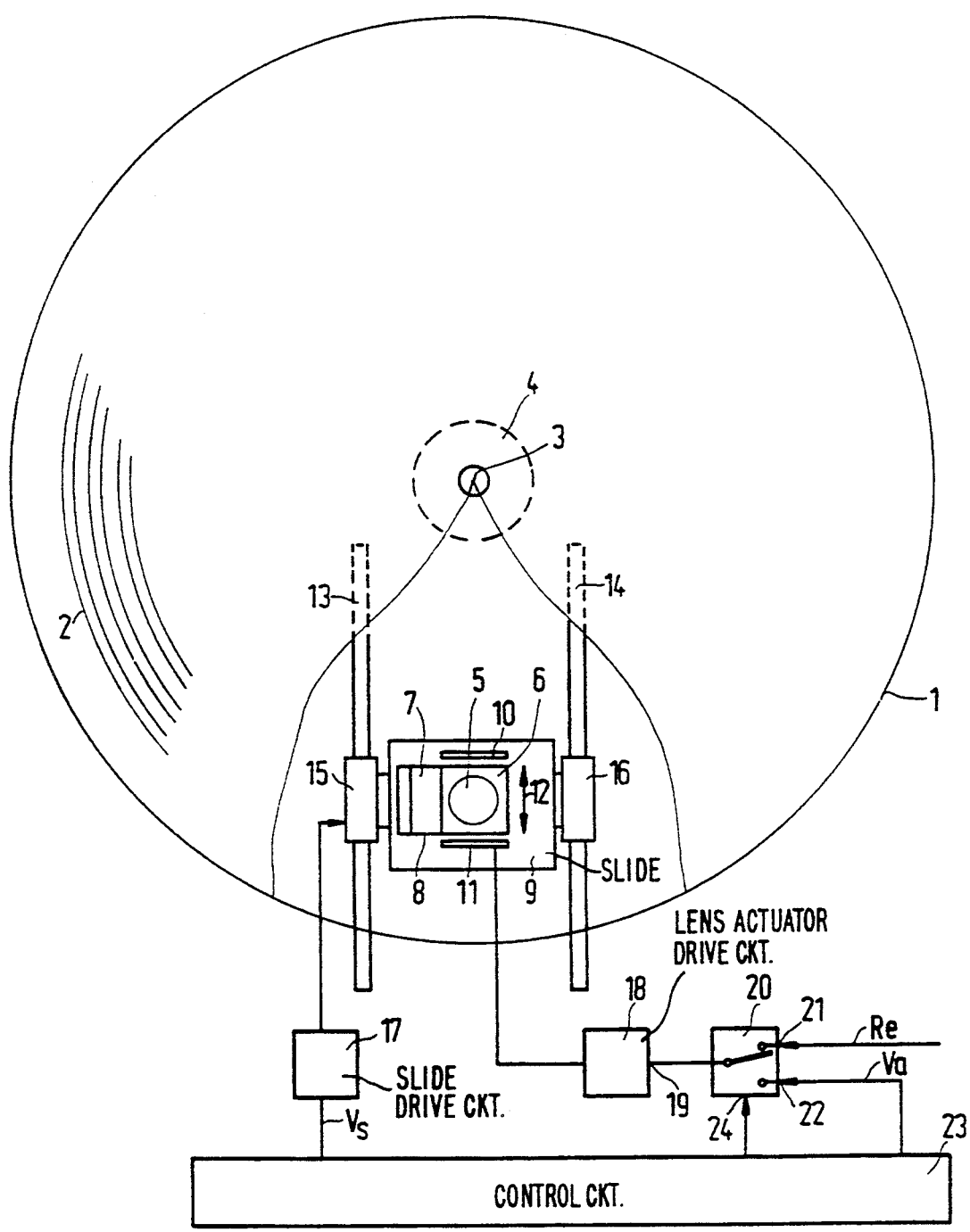

FIG. 1 shows a first embodiment of a device according to the invention. Reference numeral 1 denotes a recording medium in the form of an optically writable and readable record carrier of a customary type. The record carrier 1 is disc-shaped and comprises tracks 2 which are concentric relative to a point of rotation 3. The record carrier 1 is driven by drive means in the form of a rotary drive motor 4. Opposite to the rotating record carrier 1 a lens 5 is arranged for focusing a radiation beam thereon. The lens 5 forms part of an optical transducer of a customary type which produces a signal indicative of optical properties at the scanning point determined by the spot produced by the radiation beam when it strikes the record carrier 1. The lens 5 is accommodated in a lens carrier 6 which is attached by wire springs 7 and 8 to a carrier body 9 also termed slide. The lens carrier 6 is permanently magnetized. By means of actuator coils 10 and 11 a force may be exerted on the lens carrier 6 as a result of which the lens 5 can be displaced transversely to the tracks 2 in a direction indicated by an arrow 12. The device comprises means for driving the slide 9 in a direction transverse to the tracks 2. In the embodiment shown the slide drive means comprise linear motors whose permanent magnet stators are referenced 13 and 14 and whose translator coils cooperating with the stators are referenced 15 and 16. The translator coils 15 and 16 are fed by an energizing circuit 17. The energizing circuit 17 is of a customary type energizing the coils with currents which produce a force that corresponds to a slide drive control signal Vs between the translator coils 15 and 16 and the stators 13 and 14. The coils 10 and 11 of the actuator are fed by an energizing circuit 18 of a customary type which energizes the coils 10 and 11 with currents that produce a force between the lens carrier 6 and the coils 10 and 11, which force is determined by a signal on an input 19 of the energizing circuit 18 which is supplied by a multiplex circuit 20. The multiplex circuit 20 has two signal inputs. One (21) of the two signal inputs is a tracking error signal Re derived in a customary fashion, denoting the deviation between the scanning point and the middle of the track to be scanned. The other (22) of the two signal inputs is an actuator control signal Va. The actuator control signal Va as well as the slide drive control signal Vs are generated by a control circuit 23. In addition, the control circuit 23 brings the multiplex circuit 22 into the desired operation mode via a signal line 24.

The control circuit 23 may be a program-controlled processor loaded by means of a suitable program for generating the signals Va and Vs and controlling the multiplex circuit 20.

In the case where the scanning device is driven in the tracking mode, in which the scanning point is to remain on a track, the control circuit 23 controls the multiplex circuit 20 to supply the tracking error signal Re to the energizing circuit 18. In this situation the position of lens 5 will be adjusted to reduce the tracking error signal value essentially to zero.

If the device is driven in the displacing mode, in which the scanning point is to be displaced to a new target track over a large distance, the multiplex circuit 20 is controlled to supply the actuator signal Va to the input 19 of the energizing circuit 18. Simultaneously, the control circuit 23 generates the drive signals Vs and Va which are to cause such a displacement to be effected. The drive control signals Va and Vs are tuned to each other, so that the speed with which the scanning point is displaced over the record carrier 1 constantly substantially corresponds to the speed with which the slide 9 is displaced relative to the record carrier drive motor 4.

The required relation between the control signals Va and Vs will further be explained with reference to the drawing FIGS. 2 and 3.

Figure 2:
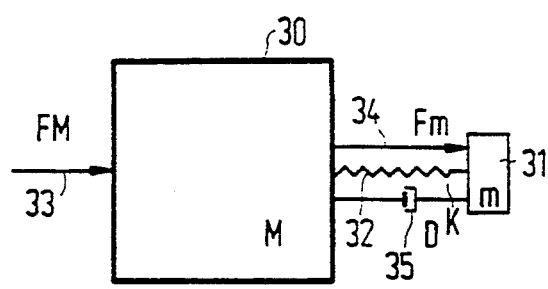
FIG. 2 shows a mechanical equivalent circuit diagram of part of the device according to the invention.

FIG. 2 shows a mechanical equivalent circuit diagram of the slide/actuator combination. A block 30 denotes the mass M of the slide (9). The total mass m of the lens carrier 6 and lens 5 is denoted by a block 31. The spring constant of the springs 7 and 8 by which the lens carrier 6 is attached to the slide is referenced 32. Any mechanical damping is referenced 35. The force FM exerted on the slide 9 by the translator coils 15 and 16 of the motor is indicated by an arrow 33. The force Fm exerted on the lens carrier 6 by the actuator coils 10 and 11 is indicated by an arrow 34. The acceleration of the slide 9 caused by force FM equals the force FM divided by mass M. The acceleration of lens carrier 6 caused by the force Fm equals the force Fm divided by mass m. If the proportion between the forces FM and Fm equals the proportion between the masses M and m, the accelerations of the two masses relative to the housing of the device will be equal to each other and thus the position of mass m relative to mass M will remain unchanged. This means that in the case where the translator coils 15 and 16 as well as the actuator coils 10 and 11 are energized, so that the consequent forces FM and Fm with a displacement of slide 9 constantly present the proportion mentioned above, the position of the lens 6 relative to the slide 9 remains the same.

Figure 3:
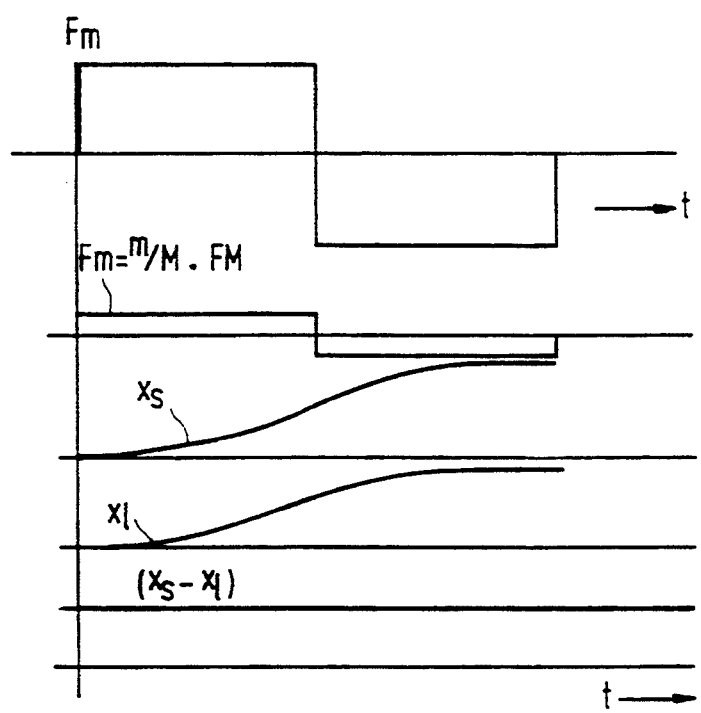
FIG. 3 shows a plurality of magnitudes featuring a displacement plotted against time.

FIG. 3 shows by way of illustration the forces Fm and FM, the associated displacement xs of the slide, the associated displacement xl of the lens and the position (xs−xl) of the lens relative to the slide, plotted against time t.

In the tracking mode in which the scanning point follows a track, the slide 9 is generally kept in a position so that the average position of the lens carrier 6 substantially corresponds to the middle of its displacement range.

In the case where a new target track is to be sought, the slide is displaced in the direction of the new target track. When the target track is reached, the device is changed to the tracking mode and the scanning point will be kept on the track by adjusting the energizing of the actuator coils 10 and 11. Since the position of the lens 5 at the end of the displacement of slide 9 still substantially corresponds to the position at which the displacement has started, the lens will be in a favorable starting position (about the middle of the displacement range) when the tracking mode is changed to again.

It will be evident to the expert that in practice the drive described with reference to FIGS. 2 and 3 is hard to realize. As a result of parameter deviations and disturbances, the variation of the displacement of the scanning point and the variation of the displacement of the slide will show discrepancies, so that the lens may end up out-of-center of its range of movement. This may be eliminated by determining the position of the lens and adjusting the control of the slide or lens movement, so that the lens substantially continues to be in the center of its range of movement.

Preferably, however, the scanning point displacement and the slide displacement are controlled according to a substantially equal displacement profile with the aid of feedback control systems in which signals indicative of the actual displacements are compared with reference displacements, and the drive control signals Va and Vs are set at values for which the displacement signals remain substantially equal to the reference displacements.

This may be effected, for example, by speed servo controls in which the actual speeds are measured and kept equal to a reference speed profile. Alternatively, it is possible to use position servo controls in which the actual positions of the scanning point and the slide are compared with a reference position profile. Preferably, however, speed servo controls are used.

FIG. 4 shows embodiments of speed servo controls which can be used in the device according to the invention.

In this embodiment an optical transducer is installed on slide 9. This transducer comprises a beam source, for example formed by a semiconductor laser 40, which generates a radiation beam 41 which is focused on the record carrier 1 through the lens 5. The spot at which the radiation beam 41 strikes the record carrier 1 is termed the scanning point. This scanning point is referenced 42. The radiation beam 41 is reflected by the record carrier 1. The reflected beam is then affected by the optical properties in the place of the scanning point 42. The beam reflected by the record carrier is separated from the incident beam by a beam splitter 43, for example, a semi-transparent mirror, and then projected on an optical detector 45. On the basis of detected signals transferred by the optical detector 43, the information represented by an information pattern in the scanned portion of the record carrier 1 can be recovered. In addition, on the basis of the detected signals, the position of the scanning point relative to a track 2 as well as the speed of the scanning point 42 relative to the track 2 may be determined. For a detailed description of this position detection and speed detection, reference be made, for example, to EP-A 0 463 959 and EP-A 0 362 938, which documents are considered incorporated in this description by reference. In FIG. 4 reference character 46 denotes a customary circuit for deriving the tracking error signal Re which denotes the deviation between the scanning point 42 and the middle of the track and for deriving a speed signal V1 denoting the speed with which the scanning point 42 is displaced in a direction transverse to the tracks 2. The signals Re and V1 are applied to the inputs of a double input multiplex circuit 47 which transfers either signal to an output 49 in dependence on a control signal received on a control input 48. The signal on the output 49 is applied through a comparator circuit 50 to an input 51 of a control circuit 52 of a customary type, for example a proportional and integrating-action control circuit. The control circuit 52 derives from the received signal on input 51 an actuator control signal Va such that the signal on the input 51 will be maintained at a value substantially equal to zero.

The operation of the control system described hereinbefore in the displacement mode is different from that in the tracking mode. In the tracking mode the control system operates as a tracking controller. With a tracking controller the tracking error signal Re is transferred to the output of the multiplex circuit 47. The actuator is controlled in dependence on the tracking error signal Re, so that the tracking error continues to be small and the scanning point thus continues to follow the track.

In the displacing mode the scanning point speed signal V1 is transferred to the output of the multiplex circuit 47. The control circuit then acts as a speed controller controlling the actuator in such a way that the speed signal V1 conforms to a speed reference signal Vrefl applied to the comparator circuit 50 and thus causes the speed of the scanning point 42 to follow a speed behavior that corresponds to the speed behavior of the speed reference signal Vrefl.

For controlling the speed of the slide 9, the device shown in FIG. 4 comprises a second control system which in a displacing mode controls the speed of the slide with a speed substantially equal to the controlled speed of the scanning point 42. This control system comprises a speed detector 53 for detecting the speed with which the slide is displaced. Such a speed detector may comprise, for example, a linear tacho generator whose translator is mechanically coupled to the slide 9 and whose stator is rigidly connected to the housing of the device. However, different types of speed detectors are likewise suitable.

The speed detector 53 produces a slide speed signal Vsl which is compared in a comparator circuit 54 with a speed reference signal Vrefs. An error signal depending on the difference between the measured signal Vsl and the reference signal Vrefs is applied to a control circuit 55 which derives therefrom the slide drive control signal Vs which is applied to the energizing circuit 17.

The device shown in FIG. 4 further includes a control circuit 56 for controlling the multiplex circuit 47 and for generating the speed reference signal Vrefs. The scanning signal speed reference signal Vrefl is proportional to the slide speed reference signal Vrefs, and is derived therefrom by means of an amplifier 57 having a gain factor K. The gain factor K is selected equal to the ratio between a measured constant k1 and a measured constant k2, the measured constant k1 denoting the relation between the measured scanning point speed signal V1 and the associated speed of the scanning point 42, and the measured constant k2 denoting the relation between the measured slide speed signal Vsl and the associated speed of the slide 9. With this value of the gain factor K the controlled speed of the scanning point 42 and the controlled speed of the slide 9 will be substantially equal.

In the tracking mode, in which the scanning point 42 is to follow the track 2, the control circuit 56 brings the multiplex circuit 47 to a state in which the tracking error signal Re is applied to the comparator circuit 50. In addition, the speed reference signal Vrefsl is maintained equal to zero. This means that the position of the scanning point 42 is controlled by the control circuit 51 so that the scanning point continues to follow a track 2. The track 2 is basically helical, so that with a fixed slide position the position of the lens 5 will be slowly moved to the end of its range of movement. Such a movement of the lens to the end of its range of movement is undesired, and may be prevented by controlling the position of the slide with an actuator position signal Vpsa which is indicative of the deviation of the actual position of lens 5 relative to the center of the range of movement of the lens 5. The actuator position signal Vpsa may be obtained by a position detector detecting this deviation. The actuator position signal Vpsa may be applied to a third input of the comparator circuit 54. This results in a displacement of the slide 9 in a direction such that the average lens position continues to be substantially in the center of the range of movement of the lens 5.

If the control circuit 52 derives a slide drive control signal Vs having a signal component that consists of an integrated value of the error signal applied to the input of the control circuit 52, this integrated value may be used for adjusting the slide position. For that matter, this integrated value is indicative of the position of the lens 5 relative to the slide 9. The latter method is advantageous in that no further position detector is necessary. The actuator position signal Vps may also be obtained by optical means in response to signals produced by the detector 45, as described for example, in EP-A-0 259 913. Advantageously, a linear combination of said inverted value and values of signals obtained by optical means can be used for the actuator position signal. If such a linear combination is used, the control sensitivity to tolerances in the speed detector 53 is very small.

Figure 5A:
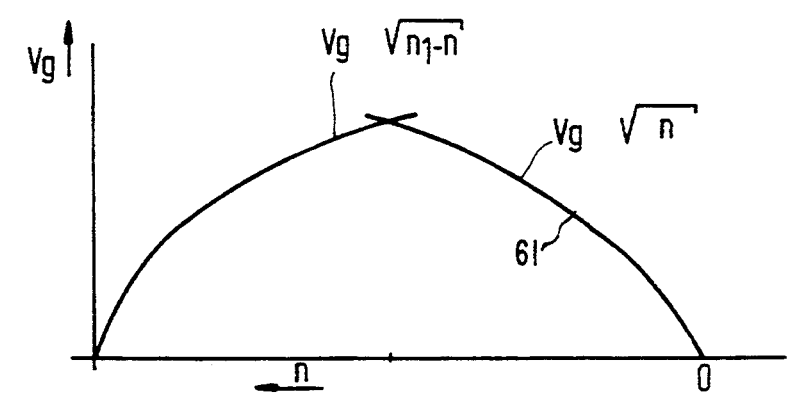
FIG. 5a shows a speed profile plotted against the number of tracks still to be passed.

When the scanning point is to be taken to a new target track outside the range of movement of the lens 5 for a search action, the slide 9 will have to be displaced. In that case first the speed profile is established which determines the speed variation with which the scanning point is to be displaced relative to the tracks to reach the new target track. This speed profile may be a function of time. Preferably, however, the speed profile is a function of the distance between the instantaneous position of the scanning point 42 and the position of the new target track. This distance may simply be detected by counting the number of tracks to be passed by the scanning point 42. By decrementing by one the number of tracks to be passed after each track transition, the measure for the distance to the target track is always available. The manner in which such a computation is performed is described, for example, in the published Patent Application EP-A 0 463 959 and EP-A 0 362 938 mentioned hereinbefore. An example of a suitable speed profile indicating the desired speed Vg plotted against the number of tracks n still to be passed is shown in FIG. 5a. For the speed profile portion denoted by reference character 60 the relation between the desired speed Vg and the number of tracks n still to be passed is given by the equation $Vg = (n1-n)^{}-\frac{1}{2}$, with n1 being the total number of tracks to be passed. For the speed profile portion denoted by reference character 61 the relation is given by the equation $Vg = n^{}-\frac{1}{2}$. A control in accordance with the speed profile shown in FIG. 5a results in a constant acceleration to halfway the distance to be covered, followed by a constant deceleration up to the moment when the new target track is reached. The associated speed behavior as a function of time is triangular. It should be observed that the speed profile shown in FIG. 5a is known per se from control engineering.

In the displacing mode, in which the scanning point is to be taken to a new target track, the control circuit 56 generates a speed reference signal Vrefl which corresponds to the speed profile shown in FIG. 5a. This may, for example, be realized by permanently storing the speed profile in the memory and, during the slide displacement, each time after a detected track transition, fetching the associated value of the speed profile from the memory on the basis of the number of counted track transitions, and adjusting the signal value of the reference signal Vrefs in accordance with this fetched value.

In addition to the reference signal Vrefs being generated, the multiplex circuit 47, in the displacing mode, is caused to adopt a state in which the speed signal V1 is transferred to the comparator circuit 50. This causes the speed of the scanning point 42 relative to the tracks 2 to be kept equal to the speed with which the slide 9 is displaced.

Figure 5B:
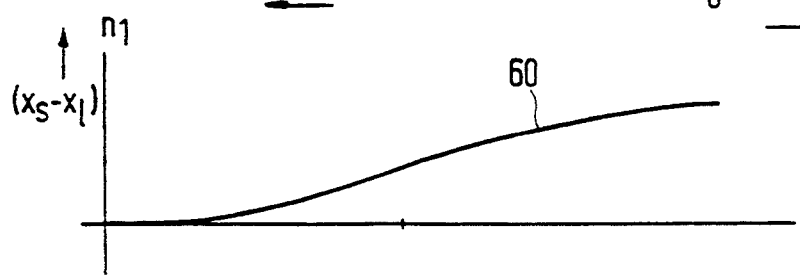
FIG. 5b shows the position of the movable transducer portion with a variable behavior of the speed control systems.

In principle, in the displacing mode, the actuator position signal Vpsa can be refrained from being applied to the comparator circuit 54, provided that the dynamic behavior (determined by the transfer characteristic) of the two speed control circuits sufficiently corresponds. However, it is to be preferred to maintain the supply of the actuator position signal Vpsa in the displacing mode. For that matter, in that case there is avoided that the position of the lens 5 relative to the slide 9 is changed undesirably much during the displacement of the slide, as a result of the difference in behavior between the two speed control systems. FIG. 5b shows by way of illustration the change (xs−x1) of the lens position relative to the slide by means of a curve 60 for the case where the gain factor K of the amplifier 57 slightly deviates from the required value and where the actuator position signal Vpsa is not applied to the comparator circuit 54. As a result of the incorrect value of the gain factor K there will be a difference between the speed of the scanning point 42 and the speed of the slide 9, resulting in a changing position of the lens 5 relative to the slide 9. By applying the actuator position signal Vpsa to the comparator circuit 54, the development of a change of the position of the lens 5 relative to the slide 9 is counteracted.

The use of two control circuits, both controlled in accordance with a same reference profile, enables a very fast displacement of the scanning point to a random new target track. By using feedback circuits, the system becomes less sensitive to disturbances and possible parameter deviations. By additionally adjusting the slide speed as a function of a signal which indicates a deviation of the displaceable movable transducer portion relative to a desired position, there is achieved that in the event of differences in the transfer characteristics of the two different speed control circuits the displaceable movable transducer portion still remains near to its desired position during the displacement of the slide.

In addition, as a result of the speed feedback, the tracking is less sensitive to shock. The slide displacement as a result of the feedback used is also hardly sensitive to the position (horizontal or vertical) in which the device is placed.

The invention is pre-eminently suitable for use in devices in which the displacement movable transducer portion is attached to the slide 9 with springs. Such an attachment has no mechanical play and the dynamic behavior is linear. These two properties are advantageous from a control engineering point of view. Furthermore, the sound production remains extremely low for such an attachment. With high velocities there is no cogging thwarting the focusing and as a result of which a large bandwidth becomes necessary for focus control.

It should be observed, however, that the implementation of the invention is not restricted to applications with the spring-mounted movable transducer portion. Also in applications in which the movable transducer portion is mounted on a swivel arm the invention may be advantageous. For that matter, if the point of rotation of the swivel arm does not exactly coincide with the center of gravity of the swivel arm, the position of the movable transducer portion is affected by the accelerations of the slide. Especially with very fast accelerations necessary for obtaining fast access times, this influence may also become undesirably large when swivel arms are used.

Finally, it should be observed that the implementation of the invention is not restricted to optical scanning systems. The invention may likewise be used in two-stage positioning systems in other scanning devices, for example, magnetic scanning devices.

I claim:

1. A scanning device for scanning a record carrier having a plurality of parallel adjacent tracks, which device can be selectively set to operate in either of a tracking mode and a displacing mode; said scanning device comprising:

a transducer for producing a scanning point on the record carrier and a scanning signal indicative of properties of the record carrier at the positions of the scanning spot thereon during scanning, said transducer being supported on a carrier body which is displaceable in a direction transverse to said tracks, the scanning point position being controllable in said transverse direction by at least an element of said transducer which is movable relative to said carrier body in said transverse direction;

carrier body drive means for displacing the carrier body in said transverse direction in response to a carrier body drive control signal supplied to said carrier body drive means;

actuator means for displacing said moveable transducer element in said transverse direction in response to an actuator drive signal supplied to said actuator means;

a detection circuit for receiving said scanning signal from said transducer and deriving therefrom a tracking error signal indicative of scanning spot position relative to a track being scanned;

an actuator drive circuit for receiving the tracking error signal and deriving therefrom an actuator drive signal for said actuator means to cause it to maintain the scanning point on a track being scanned; and a first displacement control circuit for supplying a drive control signal to said carrier body drive means which causes it to displace the carrier body in said transverse direction in accordance with a predetermined displacement versus time profile;

characterized in that said scanning device further comprises a second displacement control circuit coupled to said actuator drive circuit and which, when said scanning device is in said displacing mode, supplies a drive control signal to said actuator drive circuit to cause it to adjust the actuator drive signal so that the scanning point is displaced in accordance with a displacement versus time profile substantially the same as the displacement versus time profile of said carrier body.

2. A scanning device as claimed in claim 1, wherein said second displacement control circuit receives said tracking error signal from said detection circuit and derives therefrom a position signal indicative of the position of the moveable transducer element relative to the carrier body, said position signal being supplied to said first displacement control circuit; and in response to said position signal said first displacement control circuit adjusts the carrier body drive control signal to produce a displacement of the carrier body which results in positioning of the moveable transducer element within a predetermined displacement range relative to said carrier body.

3. A scanning device as claimed in claim 1, further characterized in that:

said first displacement control circuit comprises means for detecting the speed of displacement of said carrier body and producing a first speed signal corresponding thereto, and means for adjusting the carrier body drive control signal so that said first speed signal remains substantially equal to a first reference signal;

said second displacement control circuit comprises means for detecting the speed of displacement of said scanning point and producing a second speed signal corresponding thereto, and means for adjusting the actuator drive signal produced by said actuator drive circuit so that said second speed signal remains substantially equal to a second reference signal; and said scanning device further comprises means for generating said first and second reference signals, the two reference signals representing substantially the same displacement versus time profiles.

4. A scanning device as claimed in claim 2, further characterized in that:

said first displacement control circuit comprises means for detecting the speed of displacement of said carrier body and producing a first speed signal corresponding thereto, and means for adjusting the carrier body drive control signal so that said first speed signal remains substantially equal to a first reference signal;

said second displacement control circuit comprises means for detecting the speed of displacement of said scanning point and producing a second speed signal corresponding thereto, and means for adjusting the actuator drive signal produced by said actuator drive circuit so that said second speed signal remains substantially equal to a second reference signal; and said scanning device further comprises means for generating said first and second reference signals, the two reference signals representing substantially the same displacement versus time profiles.

* * * * *